(12) United States Patent
Sekiya et al.

(10) Patent No.: US 7,373,044 B2
(45) Date of Patent: May 13, 2008

(54) OPTICAL LINK MODULE, OPTICAL INTERCONNECTION METHOD, INFORMATION PROCESSOR INCLUDING THE OPTICAL LINK MODULE, SIGNAL TRANSFER METHOD, PRISM AND METHOD OF MANUFACTURING THE PRISM

(75) Inventors: Kazuo Sekiya, Tokyo-to (JP); Tadashi Fukuzawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 11/151,750

(22) Filed: Jun. 13, 2005

(65) Prior Publication Data

US 2006/0002713 A1    Jan. 5, 2006

Related U.S. Application Data

(62) Division of application No. 10/825,896, filed on Apr. 16, 2004, now Pat. No. 6,947,671.

(30) Foreign Application Priority Data

Apr. 18, 2003    (JP)    ............... 2003-113726

(51) Int. Cl.
  *G02B 6/34*    (2006.01)
  *G02B 6/26*    (2006.01)
  *G02B 6/42*    (2006.01)
  *G02B 5/04*    (2006.01)
  *H04B 10/06*    (2006.01)

(52) U.S. Cl. .................... 385/36; 385/14; 385/15; 385/31; 385/39; 385/47; 385/49; 398/140; 398/141; 398/164; 398/170; 398/202; 398/212; 398/214; 359/831; 359/837

(58) Field of Classification Search .............. 385/36; 398/212
See application file for complete search history.

(56) References Cited

U.S. PATENT DOCUMENTS 6,921,214 B2 * 7/2005 Wilson .................. 385/89

FOREIGN PATENT DOCUMENTS

| JP | 54-10754 | 1/1979 |
|----|----------|--------|
| JP | 02-101405 | 4/1990 |
| JP | 06-273641 | 9/1994 |
| JP | 09-127375 | 5/1997 |
| JP | 2002-243990 | 8/2002 |

* cited by examiner

*Primary Examiner*—Frank G. Font
*Assistant Examiner*—Ryan Lepisto
(74) *Attorney, Agent, or Firm*—Richard M. Goldman; Shimokaji & Associates, P.C.

(57) ABSTRACT

An optical link module of the present invention for connecting light beams by deflection and including light-emitting devices arranged in a planar manner; an optical fiber bundle that is an optical waveguide for receiving the light beams from the light-emitting devices, and an optical turn which includes a plurality of aspherical lenses which are disposed between the light-emitting devices and the optical fiber bundle and are formed while corresponding to the number of the light-emitting devices and the number of optical fibers.

3 Claims, 14 Drawing Sheets

OPTICAL LINK MODULE, OPTICAL INTERCONNECTION METHOD, INFORMATION PROCESSOR INCLUDING THE OPTICAL LINK MODULE, SIGNAL TRANSFER METHOD, PRISM AND METHOD OF MANUFACTURING THE PRISM

CROSS REFERENCE TO RELATED APPLICATION

This application is a division of our commonly assigned, U.S. patent application Ser. No. 10/825,896, filed Apr. 16, 2004 now U.S. Pat. No. 6,947,671 for Optical Link Module, Optical Interconnection Method, Information Processor Including The Optical Link Module, Signal Transfer Method, Prism And Method Of Manufacturing The Prism.

BACKGROUND OF THE INVENTION

The present invention relates to information transmission using light in an information processor. More particularly, the present invention relates to an optical link module capable of linking light beams emitted from light emitting devices with high efficiency in a compact volume, an optical interconnection method, an information processor using the optical link module, a signal transfer method in the information processor, a prism used in the optical link module and a method of manufacturing the prism.

With the recent advancement in information-processing technologies, the capacity and the speed of communication between and within housings of information processors have been dramatically advanced. In the immediate future, a speed of a communication request transmitted from one piece of processor board will exceed 1 Tbps. Accordingly, it is predicted that it will be impossible to load connectors for information communications on a card edge by use of a conventional signal communication method. In this case, a transfer rate before coding is predicted to be several Gbps per channel.

In such a case, a signal communication system using an optical link with a large information transfer rate and capacity is considered to be necessary for resolving the above-described problem to a great extent. However, conventional optical link modules are mainly for middle-/long-distance applications such as the Internet and a telephone system and thus the number of channels thereof is overwhelmingly smaller than that of an optical link module used for a computer. Consequently, the art has concentrated on link modules having only one fiber channel built-in by means of high-speed modulation of several 10 Gbps or more by use of a large device.

As to the fiber used for the above-described purpose, because of the necessity of suppressing mode dispersion noise to be low across a long distance and securing a high transmission rate, it is required to use a single mode fiber with a core diameter of about 5 micrometers. Moreover, as to a laser diode, because of the necessity of transmitting light across a long distance, a laser diode with a high output power is required and thus an edge emitting laser is used. Accordingly, the size of a light emitting part of the laser diode is 1 micrometer or less. In assembly thereof, alignment of an optical axis, referred to herein as "active alignment", is always required and thus an assembly cost becomes high.

Meanwhile, for applications to information processors in computers such as a microcomputer, a server, a main frame, a supercomputer and a massively parallel processing computer, requests are completely different from one another. A transmission distance required in the inside of the information processor is at a minimum on the order of several decimeters to several meters, which is very different from the case of a long-distance communication. As the optical fiber, a low-cost multimode fiber sufficiently guarantees a high-speed transmission band. However, in order to realize high-density packaging on a circuit board, individual components are required to be extremely compact. Moreover, it is also assumed that signals between integrated circuits within the circuit board are transmitted directly between circuit boards. Thus, smallness of a time delay, that is, latency is demanded more than throughput per channel. Meanwhile, a required modulation speed is assumed to be about 10 Gbps within a range capable of driving a CMOS logic IC as a semiconductor element. In addition, considering arrangement of many circuits, it is required to maintain the cost per channel to be significantly low.

Furthermore, in recent years, a laser diode (LD) called a vertical cavity surface emission laser (VCSEL), which emits light vertically to a surface of a wafer substrate, has been developed and available in the market. Thus, two-dimensional parallel integration has become possible. Meanwhile, a light receiving part includes a photodetector (hereinafter referred to as a PD) which is approximately formed of photoelectric convertors such as photodiodes and phototransistors. Since the PD receives light on its surface, there has been conventionally proposed a technology capable of two-dimensional integration. To be more specific, the VCSEL includes dot-like light-emitting devices having a diameter of about 5 to 10 micrometers, which are arranged two-dimensionally, and can directly perform on/off modulation up to about 10 Gbps or more. Moreover, the VCSEL has an advantage that the VCSEL can be manufactured at a lower cost and in larger quantities than an edge emission laser diode in which a light output edge is formed by use of crystal cleavage as in the conventional technology. Furthermore, it is known that the VCSEL can obtain a sufficient light coupling efficiency just by directly facing a graded-index multimode fiber with a core diameter of 50 micrometers and can realize a low-cost connector.

Moreover, a ribbon-shaped fiber bundle is also known, which can transfer 10 Gbps up to 100 meters without lowering a band characteristic and has the graded-index multimode fibers with a core diameter of 50 micrometers, the fibers being mass-produced and bundled in parallel. There has been advancement in standardization of a two-dimensional fiber array connector for mutually connecting fiber bundles in which several pieces of the ribbon-shaped fiber bundles are further bundled together to increase a degree of parallelization.

Considering a request for miniaturizing in the case of using the fiber bundle as a wiring of an information processor, it is preferable to adopt a structure in which the optical fiber is attached/detached by mounting an optical link module on a card edge. To adopt the above constitution, a direction of attaching/detaching the optical fiber bundle is required that is even with the circuit board surface. Specifically, it is preferable that ends of the two-dimensionally arranged optical fibers are vertical with respect to the circuit board surface. By way of contrast, an IC in which LDs and PDs are arranged two-dimensionally is mounted in parallel with (even with) a board surface. Thus, in order for the optical fiber to be coupled with the LD/PD, an optical bend is required which bends light at a right angle.

Moreover, the optical fiber is bent by utilizing the flexibility of the optical fiber while setting the direction of attaching/detaching the optical fiber bundle to be vertical to the circuit board. Thus, the LD and the PD can be directly connected to each other. However, more than 30 centimeters curvature radius is usually required to bend the optical fiber. Thus, racks for arranging a number of circuit boards are bulky and it is difficult to meet requests, such as for the miniaturization of an information processor and the saving of space therein. Furthermore, a link method using the flexibility of the above-described optical fiber has an inconvenience that it is impossible to achieve speeding-up by shortening a signal transmission distance by high-density packaging, which is an original aim.

An optical link module including parallel optical fiber bundles for the above-described information processor is described in Japanese Patent Laid-Open No. 2001-242358, with a one-dimensional array electrical turn link module. In a one-dimensional array optical link module described in Japanese Patent Laid-Open No. 2001-242358, optical fibers are disposed in parallel for 12 channels to form one array. In Japanese Patent Laid-Open No. 2001-242358, there is disclosed an optical link module, in which a VCSEL array IC and a PD array IC are vertically disposed and are connected to horizontally disposed driver IC and amplifier IC by use of flexible wiring or connected to an end of a thick copper wiring pattern by use of wire bonding.

When there are one or two parallel arrays, with an interval of 250 micrometers per channel, an electrical wiring pattern can be formed in a flexible cable. However, the optical link module disclosed in Japanese Patent Laid-Open No. 2001-242358 has a problem that an electrically bendable wiring pattern cannot be formed. Furthermore, a method of connecting the LD/PD to four sides of the IC in a space by bending the flexible cable so as to surround the space has assembly problems and poor high-frequency properties.

Furthermore, there is also known a technology of deflecting light beams for one channel by use of a prism or a mirror. For example, in Japanese Patent Laid-Open Nos. 2000-321453, 2001-141966, Hei 9(1997)-307134 and Hei 7(1995)-202350, there is disclosed a method of guiding light beams to an optical fiber end by use of an optical waveguide without specially placing a prism by utilizing the fact that the same effect as the total reflection of a prism is achieved by cutting the optical fiber end at a 45-degree angle with respect to a transmission direction of the light beams.

Moreover, in Japanese Patent Laid-Open No. Hei 8(1996)-29161, there is disclosed a prism with a lens, in which positioning in assembly is simplified. However, the optical bend disclosed therein is a one-dimensional fiber array, in which an optical path difference between channels is constant and a distance from a light-exit end to a light incident end can be shortened. However, when a two-dimensional fiber array and two-dimensional light-emitting/light-receiving devices are optically coupled together, two faces of a triangle prism, which are orthogonal to each other, are faced to a two-dimensional laser diode array. Thus, the optical element is required to have the same size as the array. This means that, when there are n of two-dimensional arrays, a distance through which light travels is increased by n times compared to the case of the one-dimensional array. Accordingly, if the conventional technology is applied as it is, there is a difficulty that the optical element cannot be realized within a range which satisfies imaging conditions of a thick lens.

Japanese Patent Laid-Open No. Hei 7(1995)-261060, describes "optical packaging" in which two pairs of two-dimensional fiber arrays are coupled together by combining a prism and a hologram optical system. However, in Japanese Patent Laid-Open No. Hei 7(1995)-261060, the optical packaging which achieves the above-described function is disclosed merely on a conceptual basis and the kind of a hologram to be used is not described. In addition, values of a coupling efficiency and the like are not evaluated therein. Moreover, in the optical packaging described in Japanese Patent Laid-Open No. Hei 7(1995)-261060, evaluation of the coupling efficiency by simulations and the like is not disclosed and nothing specific about effects obtained in actual applications is described.

Even if an attempt is made to solve the above-described problem only by use of a prism without using a lens array, this is not altogether satisfactory. Specifically, when an optical bend or turn is formed by use of a prism (or a mirror) as it is for a two-dimensional array, there is crosstalk in an adjacent channel as described later and the power of the light beam is greatly lost. A main reason for this problem is that light emitted from an LD spreads at least at 8 degrees or more on one side by diffraction at an opening portion of a VCSEL and thus a light beam has a spread of 10 to 20 degrees on one side. Furthermore, light emitted from a fiber is a multimode and thus spreads at an angle determined by NA of the fiber (since nominal NA<=>0.2 in a 50-micrometer core, 12 degrees at one side and strength of about 10%). If this light beam has to travel across a distance for 5 arrays of 12 arrays times 5 rows, a luminous flux spreads out to an adjacent channel. Thus, it is not possible to apply the optical element as it is to the signal wiring element in the information processor.

FIG. 14 shows, regarding the above-described inconvenience, an illustrative reflection behavior of a luminous flux in the case of using a prism only for both of an incidence plane and a reflection plane. FIG. 14 shows ray tracing simulation of a case where fiber ends of 12 arrays by 5 rows are coupled with LD/PD by use of a simple rectangular prism. FIG. 14 schematically shows ray tracing for one transmission channel (TCH) and for one reception channel (RCH). The ray tracing is performed assuming that ends of five optical fibers OF with a bore diameter of 50 micrometers are arranged by a pitch of 250 micrometers at a bottom of a prism 200.

Meanwhile, in the reception channel RCH, light is emitted upward from the optical fiber OF, a large part of the light undergoes total reflection at a 45-degree plane and the reflected light enters photodiodes (PD) with a bore diameter of 40 micrometers, which are disposed to be approximately adjacent to each other on the left side of the prism. Note that, in FIG. 14, the light beam entering its target PD is stopped at that point.

As shown in FIG. 14, a large part of light escapes from the target PD and is made incident on the adjacent PD above the target PD by 250 micrometers. Moreover, in the transmission channel TCH, light emitted rightward from an LD with a bore diameter of 6 micrometers, which is placed at the left end of the prism while nearly touching the prism, spreads and is reflected on the 45-degree plane before entering a target optical fiber OF, which is second from the right bottom. Similarly to the reception channel RCH, in the transmission channel TCH, it is obvious that a large part of light escapes from the target to form stray light and is made incident on the adjacent optical fiber on the right of the target by 250 micrometers.

Even if the pitches of the arranged optical fibers and PDs are increased to grow in size in order to avoid such a crosstalk, the distance through which the luminous flux has to travel is accordingly increased and there arises an inconvenience of a lowered coupling efficiency. Moreover, when the fiber end, the PD and the LD are separated from the prism, a distance through which light travels in the air (the air has a refractive index of 1, which is lower than that of the prism) is increased and thus there arises an inconvenience that characteristics are more deteriorated.

Clearly, a need exists for an optical link module for a two-dimensional parallel fiber array that is capable of obviating the above-described inconveniences, an optical interconnection method using the optical link module and an information processor including the optical link module have been heretofore demanded.

OBJECTS OF THE INVENTION

Specifically, an object of the present invention is to realize a two-dimensional optical laser array, a two-dimensional fiber array and a simple optical link module which optically couples a two-dimensional light receiving device and the two-dimensional optical fiber array with each other.

Another object of the present invention is to provide an optical interconnection method for realizing a high coupling efficiency, a negligible crosstalk and a time difference between channels in a new optical component having two-dimensional lens arrays on orthogonal two surfaces of a prism. In addition, still another object of the present invention is to provide an information processor using the above-described optical link module as a wiring element.

It is a further object of the present invention to provide a signal transfer method in the information processor, the method enabling signal transfer in the information processor by use of optical fibers.

It is another object of the present invention to provide a prism which can be used in the above-described optical link module and a method of manufacturing the prism.

SUMMARY OF THE INVENTION

The invention described herein provides an optical link module for a two-dimensional parallel fiber array that is capable of obviating the above-described deficiencies of the prior art, an optical interconnection method using the optical link module and an information processor including the optical link module have been heretofore demanded.

As a result of detailed studies on the above-described deficiencies and shortcoming of the prior art, we have determined that crosstalk between channels is mainly caused by spherical aberrations on surfaces of lenses, which corresponds to an incident laser beam. In the present invention, a multichannel optical link module is configured, which is capable of effectively reducing particularly crosstalks between channels by including respective lenses formed on surfaces of the prism as aspherical lenses and which is capable of connecting light beams with a high efficiency by improving a coupling efficiency for both of a reception channel and a transmission channel.

The aspherical lens has a surface in which a plurality of spherical lenses are continuously formed. In the aspherical lens, an outer portion has a spherical surface with a large radius and an inner portion has a spherical surface with a small radius. The above-described configuration reduces the crosstalk between channels while achieving a short focal length required miniaturization and further obtains a high connection efficiency. Furthermore, the optical link module of the present invention provides a high-speed wiring element which is excellent in flexibility and in stability for a heat property in an information processor.

In order to achieve the foregoing objects, the optical link module of the present invention is an optical link module for connecting light beams by deflection. Here, the optical link module includes: light emitting devices arranged in a planar manner; optical waveguides for receiving light beams from the light emitting devices; and an optical turn which is disposed between the light emitting devices and the optical waveguides and includes a plurality of aspherical lenses formed in accordance with the number of the light emitting devices and the number of the optical waveguides.

The optical beam bending optics of the present invention is a prism, and the aspherical lenses include a plurality of coaxial spherical surfaces having different radii. The light emitting devices in the present invention are laser diodes or light emitting diodes. The optical waveguides are optical fibers. A surface on which the light emitting devices are arranged and an incidence plane of the optical waveguides are disposed to intersect with each other. In the present invention, the aspherical lenses are concave lenses formed to protrude outward from an optical surface of the optical turn.

According to a second aspect of the present invention, an optical interconnection method is provided for connecting a plurality of parallel light beams by deflection to light receiving parts corresponding to the respective light beams from light emitting devices. The method includes the steps of: providing light emitting devices arranged in a planar manner; providing light receiving parts for receiving light beams from the light emitting devices; and deflecting the light beams between the light emitting devices and the light receiving parts by using an optical turn which is disposed between the light emitting devices and the optical waveguides and includes a plurality of aspherical lenses formed in accordance with the number of the light emitting devices and the number of the optical waveguides.

The step of deflecting the light beams according to the present invention further includes the steps of: generating refractions with different curvatures by using the aspherical lenses corresponding to the light beams from the light emitting devices and by taking an optical axis of each aspherical lens as a center; generating refractions with different curvatures by reflecting the light beams undergoing the refractions with the different curvatures and by using the corresponding aspherical lenses; generating the light beams by using any of laser diodes and light emitting diodes; and forming the light receiving parts by using any of ends of optical fibers and light receiving surfaces of photodiodes. Furthermore, in the optical interconnection method of the present invention, a time delay of the light beam before reaching the light receiving parts can be set to be equal among a plurality of light beams.

According to a third aspect of the present invention, an information processor is provided, which includes at least a central processing unit, a memory and an input/output unit. The information processor includes: an optical signal generation unit for generating optical signals from electrical signals by responding to instructions of the central processing unit; optical waveguides which receive, by use of light receiving parts, the optical signals generated by the optical signal generation unit and transmit the optical signals; and other devices which receive instructions from the central processing unit by receiving the light beams emitted from the optical waveguides and converting the light beams into electrical signals. Here, the optical signal generation unit includes: a driver part; surface emitting devices driven by the driver part; an optical turn including aspherical lenses which deflect light beams generated by the surface emitting devices and are formed in accordance with the light beams; and a coupling member for coupling a plurality of optical waveguides with the deflected light beams.

Another aspect of the invention is a surface on which light emitting devices of the of the present invention are formed and a light receiving surface of the light receiving part are disposed to intersect with each other. Moreover, it is preferable that the optical waveguides are optical fibers and the optical signal passes through the optical turn at the same time. The optical waveguides are wiring elements in the information processor.

According to a fourth aspect of the present invention, a signal transfer method is provided, which is a signal transfer method in an information processor including at least a central processing unit, a memory and an input/output unit. In this aspect the method includes the steps of: providing electrical signals based on instructions of the central processing unit; generating a plurality of optical signals, in an optical signal generation unit, from the electrical signals; transmitting the optical signals, which are generated by the optical signal generation unit, inside optical waveguides via light receiving parts; and inputting instructions from the central processing unit into other devices by receiving the optical signals emitted from the optical waveguides and converting the optical signals into electrical signals. Here, the step of generating optical signals includes the steps of: generating optical signals by driving surface emitting devices in response to the electrical signals; bending or deflecting a direction of the light beams transmission by 90 degrees by use of an optical turn including aspherical lenses formed in accordance with the optical signals; and coupling the deflected light beams with a plurality of optical waveguides via the aspherical lenses formed in accordance with the light beams.

In the present invention, the step of bending or deflecting the light beams further includes the step of: generating refractions with a plurality of different curvatures by using the aspherical lenses corresponding to the light beams from the light emitting devices and by taking an optical axis of each aspherical lens as a center.

According to a fifth aspect of the present invention, a prism is provided, which is used in an optical link module which bends or deflects light beams in an information processor. The prism includes: at least two optical surfaces through which the light beams pass; and aspherical lenses formed on the optical surfaces. The aspherical lenses according to the present invention can include a plurality of coaxial spherical surfaces with different radii.

According to a sixth aspect of the present invention, a method of manufacturing a prism is provided, the prism being used in an optical link module which deflects light beams in an information processor and includes a plurality of aspherical lenses. The method includes the steps of: providing a mold including a plurality of surfaces, which include at least a flat surface and a plurality of aspherical concave portions, and a connection surface for connecting the plurality of surfaces; introducing a plastic material into a space defined inside the mold; and obtaining a prism in which aspherical lenses are formed at least on two optical surfaces by solidifying the plastic material. The step of providing the mold includes the steps of: forming a small-diameter concave portion while sloping a small-diameter cutting tool from a rotation axis on a surface of the mold; and forming a large-diameter concave portion while allowing a rotation axis of a large-diameter cutting tool to coincide with a central axis of the small-diameter concave portion.

BRIEF DESCRIPTION OF THE DRAWINGS

For a more complete understanding of the present invention and advantages thereof, reference is now made to the following description taken in conjunction with the accompanying drawings.

DETAILED DESCRIPTION

Figure 1:
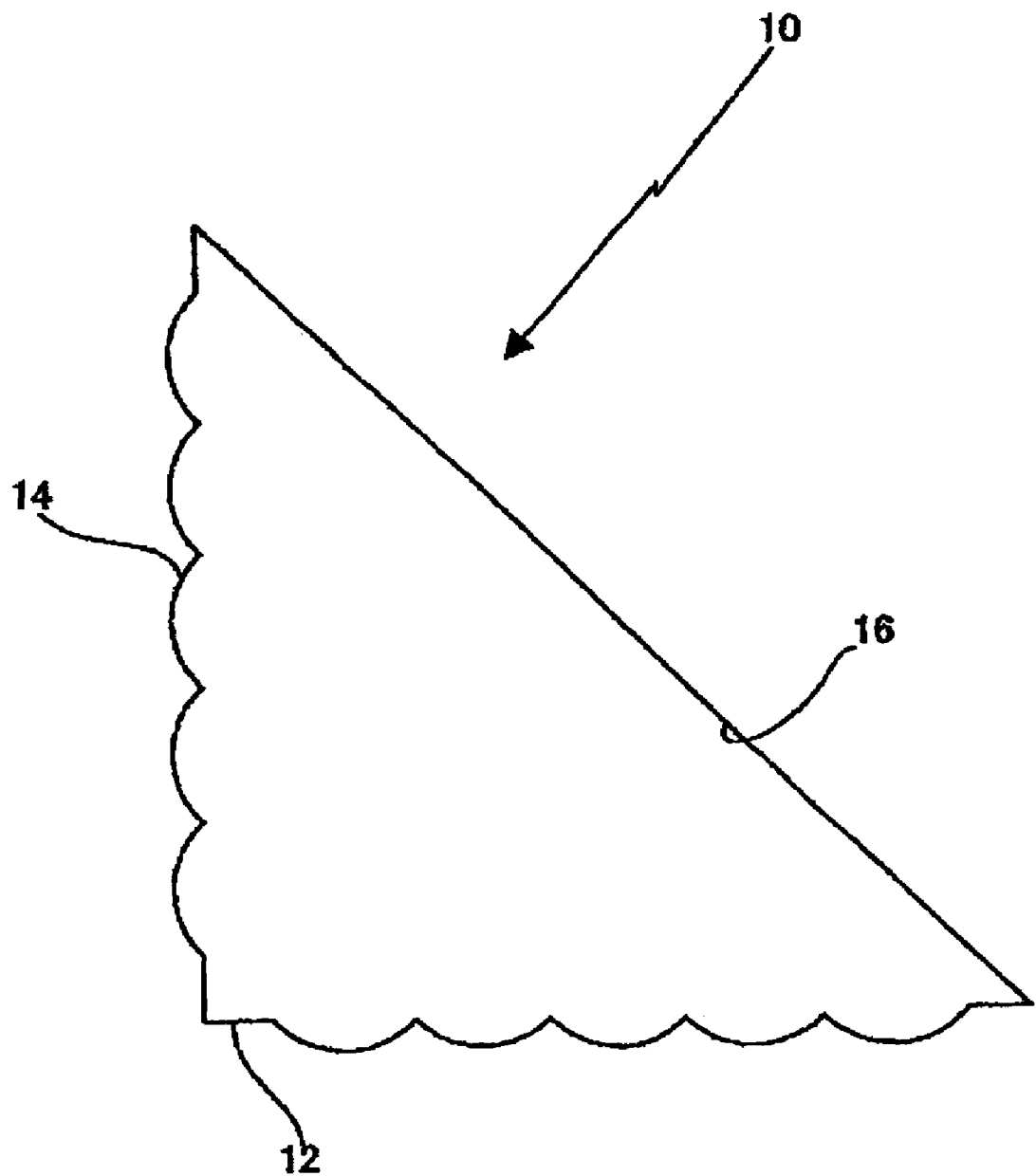
FIG. 1 is a view showing a cross-sectional shape of an optical turn of the present invention.

The present invention will be described below by use of a specific embodiment shown in the drawings. However, the present invention is not limited to the embodiment shown in the drawings. FIG. 1 shows an embodiment of a prism included in an optical link module of the present invention. The prism 10 used in the optical link module of the present invention includes: an incidence plane 12 which gives an optical interface for input/output of a light beam; an output plane 14; and a reflection plane 16 having a function of mainly reflecting the light beam made incident thereon.

The incidence plane 12 and the output plane 14 are terms used for the sake of simplicity in the description. The prism is configured in such a manner that both of the incidence plane 12 and the output plane 14 can function as the output plane and the incidence plane. Moreover, a material of the prism is not particularly limited in the present invention and various materials can be used, such as quartz glass, crystal, sodium glass, borosilicate glass, highly reflective glass added with metal, polycarbonate, polymethylmethacrylate, silicon resin and epoxy resin. According to another aspect of the present invention, besides a stereoscopic prism, any optical turn, bend, or deflection, such as holographic grating and a Fresnel lens can be used as far as effects of the present invention can be achieved.

Figure 2:
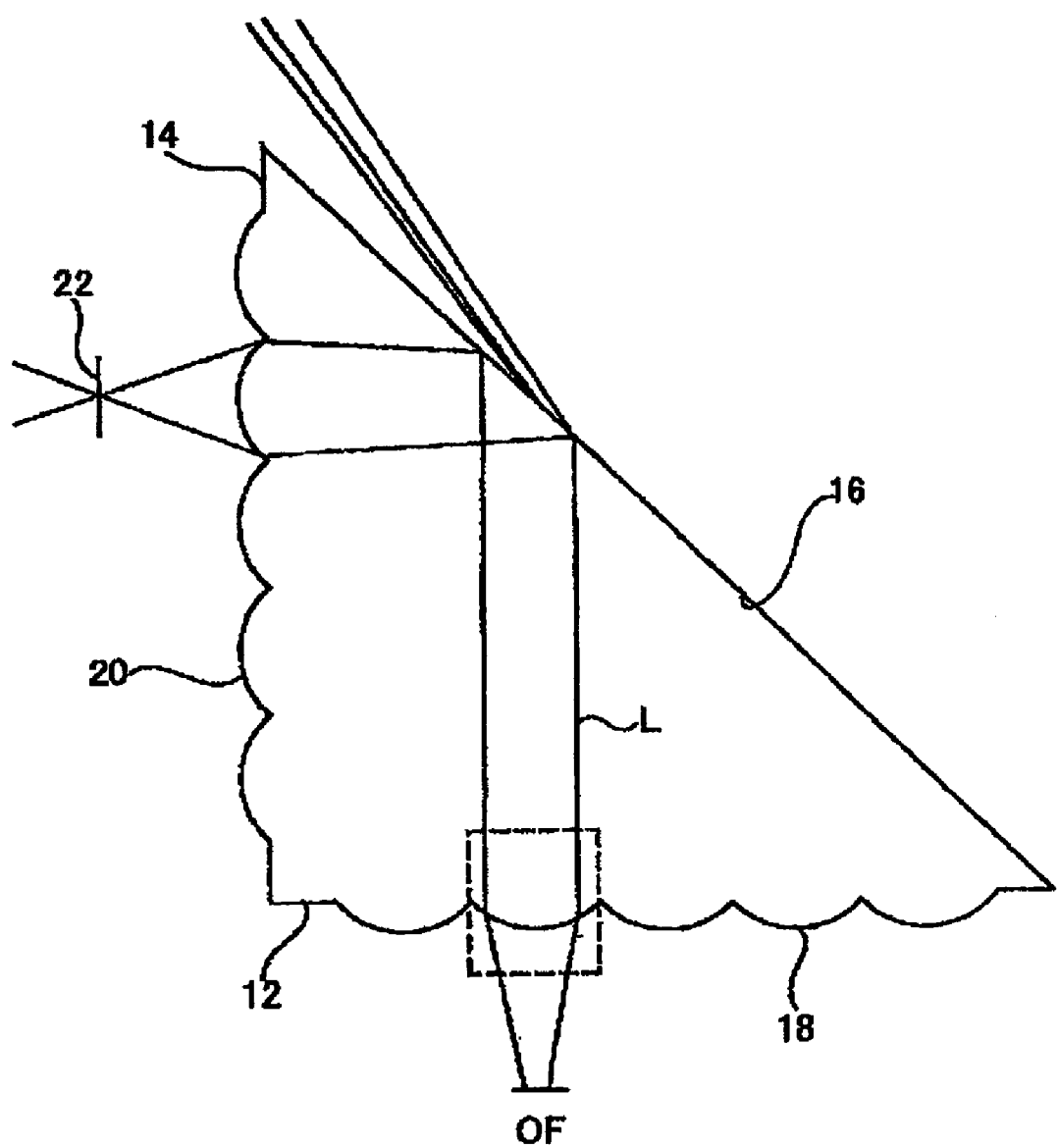
FIG. 2 is a view showing ray tracing of an optical beam deflected by the optical turn of the present invention.

On optical surfaces of the incidence plane 12 and the output plane 14, curved surfaces are continuously formed to have a shape capable of focusing beams of light. Specifically, the curved surface corresponds to a diameter of a light beam of, for example, a semiconductor laser or a light emitting device such as a light-emitting diode which is made incident in the form of a light beam. FIG. 2 is a view schematically explaining a light deflection function of the incidence plane 12 and the output plane 14, which are shown in FIG. 1. In FIG. 2, it is shown that a light beam having a diameter approximately corresponding to a diameter of a curved surface 18 is made incident on the incidence plane 12. Normally, the light beam is diffusely radiated from the semiconductor laser, an optical fiber edge and the like as described above. Thus, the light beam L made incident on the curved surface 18 is refracted to be approximately collimated and is reflected by the reflection plane 16 before reaching the output plane 14. The light beam L is converged by a curved surface 20 formed on the output plane 14 toward a light receiving portion 22 configured as an optical fiber edge or a light receiving surface of a photodetector (PD), which are configured to be coupled at an approximately predetermined focus position, for example, at a vertical angle or a suitable angle other than the vertical angle, for example, Brewster angle.

As shown in FIG. 2, in terms of configuring the optical link module by use of the prism, the curved surfaces 18 and 20 of the incidence plane 12 and the output plane 14 are required to have as small focal lengths as possible in order to achieve miniaturization. Meanwhile, shortening the focal lengths corresponds to increasing curvatures of the curved surfaces 18 and 20. As a result of study by the inventors of the present invention, we have found that a spherical aberration of the curved surfaces 18 and 20 is a main cause of generating a crosstalk between channels in the case of using the prism shown in FIGS. 1 and 2. Thus, in miniaturization, it is required to consider the spherical aberration in geometrical optics. In order to suppress the spherical aberration, it is preferable to increase radii of the curved surfaces 18 and 20 to be used as much as possible. However, the increased radii across the entire surface leads to increased focal lengths and thus a request for high integration cannot be met. Consequently, in the present invention, the curved surfaces 18 and 20 are configured as aspherical lenses.

Figure 3:
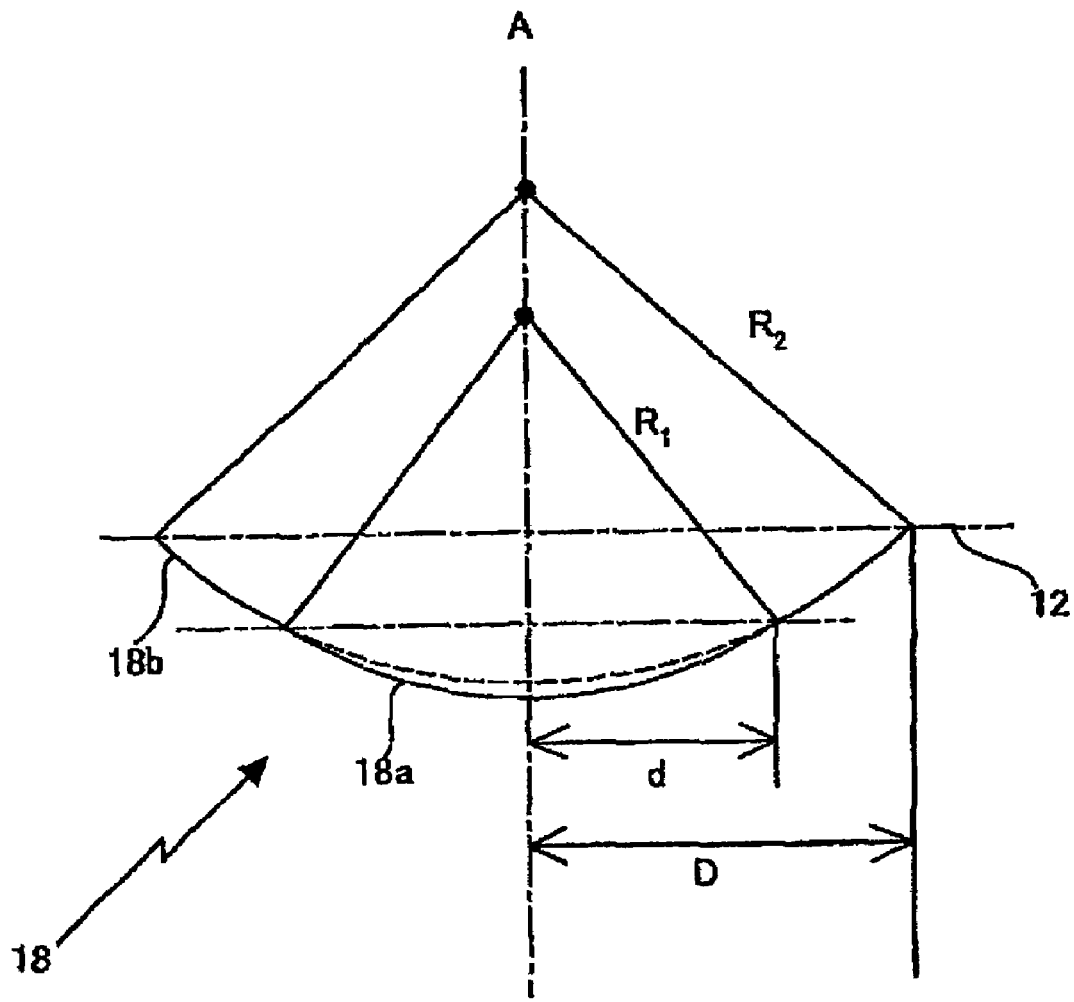
FIG. 3 is an enlarged view showing a configuration of an aspherical lens formed on the optical turn of the present invention.

FIG. 3 is an enlarged view of the configuration of the curved surface 18 indicated by the broken line in FIG. 2. In the present invention, the curved surfaces 18 and 20 can have the same shape or different shapes from each other as long as the effect of the present invention is achieved. As shown in FIG. 3, the curved surface 18 formed in the prism of the present invention has a symmetric shape with an optical axis A as its center. The curved surface 18 includes: a curved surface 18*a* formed across the optical axis A; and a curved surface 18*b* formed while surrounding the curved surface 18*a*. A radius R1 of the curved surface 18*a* is formed to be smaller than a radius R2 of the curved surface 18*b* and to have a shape which becomes more convex toward the inside of the curved surface 18.

In an embodiment of the present invention, a dimension D of the curved surface 18*b* forming an outer edge of the curved surface 18 is set to be approximately ½ of a fiber interval and thus an efficient and high-density packaging becomes possible. In the case where the fiber interval is 250 micrometers, setting the dimension D of the curved surface 18*b* to 125 micrometers and a dimension d of the curved surface 18*a* to 80 micrometers, a good coupling efficiency and a low crosstalk property can be achieved. However, when other optical turns or bends such as holographic grating or a Fresnel lens is used as another preferred aspect of the present invention, in place of a radius of the lens or a curvature thereof, any parameter capable of obtaining the same effect can be selected other than the ones described above.

Figure 4:
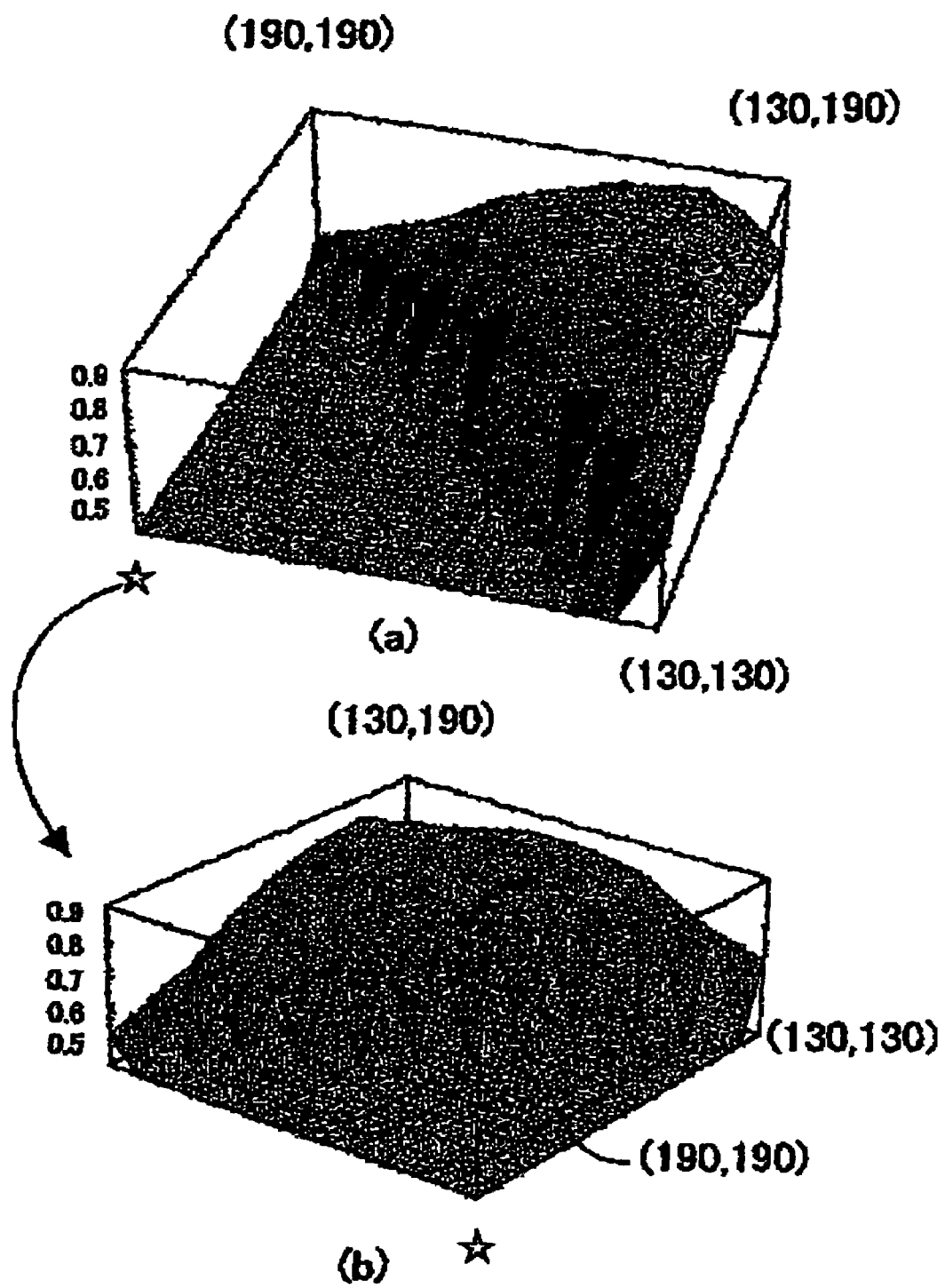
FIGS. 4A and 4B are graphs obtained by performing simulations of coupling efficiencies by the optical turn of the present invention.

FIGS. 4A and 4B are graphs obtained by performing a simulation calculation of coupling efficiencies when light emitted from an optical fiber passes twice through a lens optically connected to a prism and is made incident on a photodetector. In the simulation, the coupling efficiencies are obtained in accordance with all combinations when a radius of a small lens and a radius of a large lens are changed by 5 micrometers from 130 micrometers to 190 micrometers, respectively. The both graphs shown in FIGS. 4A and 4B are obtained from the same calculation. However, in order to show the effect according to the prism configuration of the present invention more clearly, the visual point of FIG. 4B is shifted from that of FIG. 4A approximately by 90 degrees and thus aspects of changes are shown. In FIGS. 4A and 4B, positions indicated by the star signs correspond to a common coordinate axis.

In the graphs of FIGS. 4A and 4B, values of coordinates in a vertical axis direction of mesh intersections are shown within a range of 0.5 to 1 when a coupling efficiency 1.00 is taken as one obtained by using 100% of a length of the vertical axis. As shown in FIGS. 4A and 4B, in the present invention, as to the coupling efficiency, the maximum value of 0.91 and the minimum value of 0.54 are obtained. Note that flat portions at bottoms of FIGS. 4A and 4B are areas where the radius of the inner lens is larger than the radius of the outer lens and the coupling efficiency becomes worse than that of a simple spherical lens.

Here, absolute values of the coordinate axes of FIGS. 4A and 4B will be described. In FIG. 4A, when indicated by (the radius of the small lens, the radius of the large lens), an upper left corner is (190 micrometers, 190 micrometers), a lower right corner is (130 micrometers, 130 micrometers) and an upper right corner is (130 micrometers, 190 micrometers). In FIG. 4B, a left corner (190 micrometers, 190 micrometers), a right corner (130 micrometers, 130 micrometers) and a back corner is (130 micrometers, 190 micrometers). Moreover, in FIG. 4A, calculated points on a diagonal line connecting the upper left corner and a right front corner have the same radii of the inner and outer lenses and thus the coupling efficiency thereof is one in the case of a general simple spherical lens.

As shown in FIGS. 4A and 4B, the coupling efficiencies obtained when the light beam made incident on the lenses connected to the prism passes through the lenses again and is made incident on the photodetector are shown to be largely changed in accordance with the combinations of the curvatures of the two kinds of the spherical surfaces. Meanwhile, a coupling efficiency obtained when light emitted from a vertical cavity surface emission laser (VCSEL) passes twice through the lenses formed in the prism and is made incident on the optical fiber is similarly changed. Thus, by use of the coupling efficiencies shown in FIGS. 4A and 4B, necessary coupling efficiencies can be obtained. Therefore, in the present invention, it is possible to appropriately select the combination of the two kinds of spherical surfaces in a region where the coupling efficiency between the optical fiber and the photodetector takes the maximum value so as to have less influences from an error of the lens radius, size and angle of the prism, an error of a distance between an optical device array or a fiber array and the lens, and the like.

In the specific embodiment of the present invention, the most preferable combination of the lens with a small radius, which is disposed inside, and the lens with a large radius, which is disposed outside, is as follows. It was shown that the most favorable coupling efficiency of 0.90 to 0.91 is obtained within a range of combinations including: the inner lens radius of 135 micrometers and the outer lens radius of 155 to 165 micrometers; and the inner lens radius of 140 micrometers and the outer lens radius of 155 to 170 micrometers.

A further combination is as follows. We have found that a favorable coupling efficiency within a range of 0.86 and 0.89 is obtained in respective combinations including: the inner lens radius of 135 micrometers and the outer lens radius of 145 to 150 micrometers; the inner lens radius of 135 micrometers and the outer lens radius of 170 to 175 micrometers; the inner lens radius of 140 micrometers and the outer lens radius of 150 micrometers; the inner lens radius of 140 micrometers and the outer lens radius of 175 to 185 micrometers; the inner lens radius of 145 micrometers and the outer lens radius of 155 to 165 micrometers; the inner lens radius of 145 micrometers and the outer lens radius of 175 to 180 micrometers; and the inner lens radius of 150 micrometers and the outer lens radius of 165 to 180 micrometers.

The above-described values are ones obtained when the combinations of the lens radii are set by a unit of 5 micrometers. Furthermore, any particularlities indicating significant behaviors are not seen in FIGS. 4A and 4B. Thus, it is apparent that, in the combinations of the continuous values from the minimum values to the maximum values of the above-described inner and outer lens radii, the effect of the present invention can be obtained. Meanwhile, as a result of a similar study, it is found out that the general simple spherical lens has the calculated values on the diagonal line of FIGS. 4A and 4B and gives only a coupling efficiency as low as 0.54 to 0.83. Moreover, as described later, in the simple spherical lens, there is much stray light because of the spherical aberration. Thus, it is found out that the simple spherical lens cannot be used for the purpose of reducing the crosstalk such as the object of the present invention.

Moreover, in the above-described study, it is assumed that an interval between fibers in the fiber array is 250 micrometers. However, in the present invention, it is possible to correspond to any number of fibers as long as the number is numerically in a proportionality relation. The above-described aspherical lens is formed on the incidence plane 12 and the output plane 14 of the prism and thus an optical turn can be formed on a two-dimensional fiber array. By use of this optical turn, it is possible to use a compact and highly efficient optical link module having less crosstalks.

Figure 5:
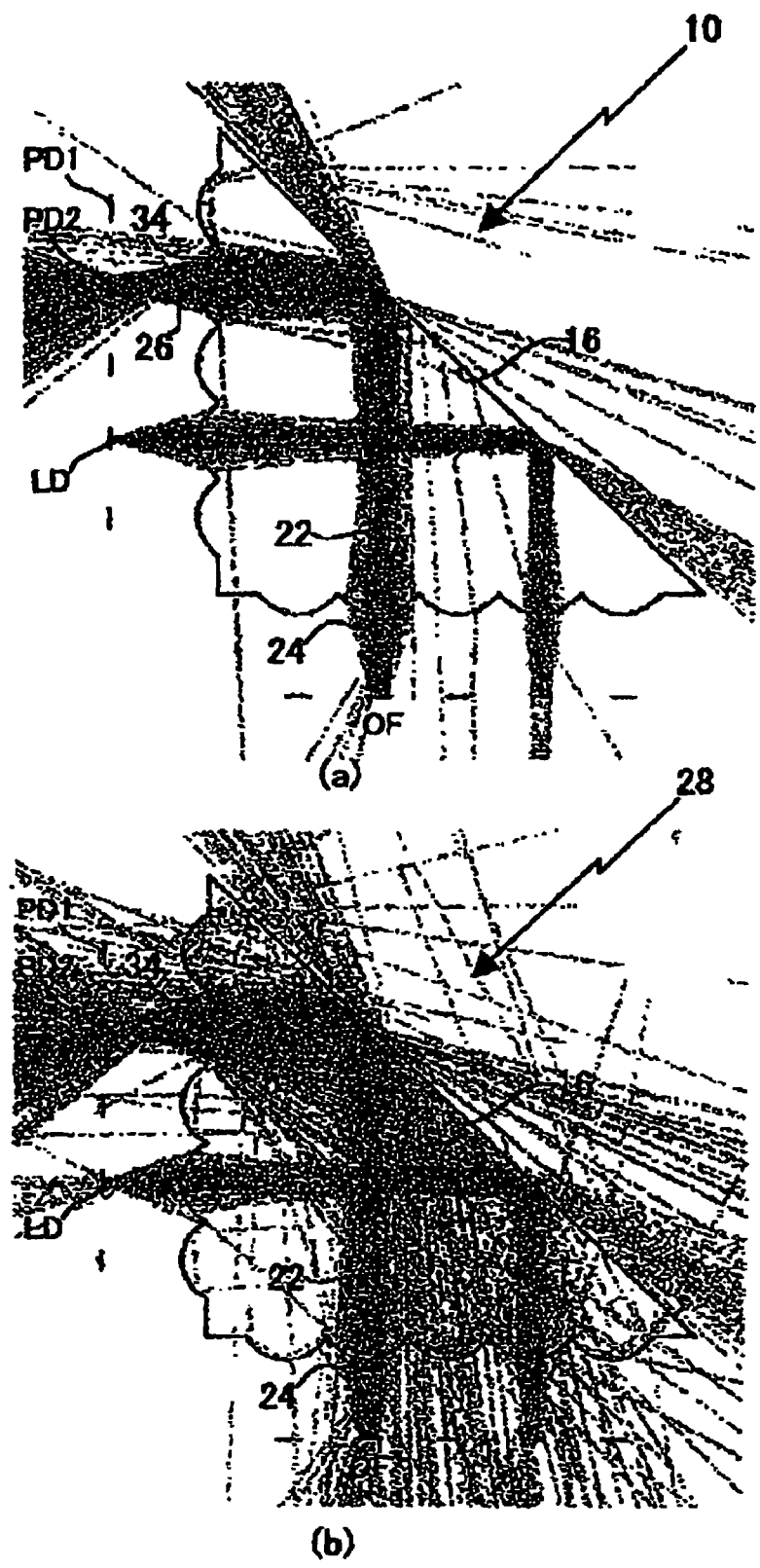
FIGS. 5A and 5B are schematic views showing results of ray tracing simulations showing crosstalks in the optical turn of the present invention.

FIGS. 5A and 5B show results of ray tracing simulations of a light beam by use of a prism formed to have aspherical lenses adjacent to the incidence plane 12 and the output plane 14 according to the present invention. FIG. 5A is a view showing the result of the ray tracing simulation in the case of using the prism of the present invention. FIG. 5B is a view (a comparative example) showing the result of the ray tracing simulation using a prism in which spherical lenses are formed on the incidence plane 12 and the output plane 14. Note that the simulations are performed by disposing an optical fiber (OF) or a laser diode (LD) on one of the incidence plane and the output plane. However, for simplicity, in FIGS. 5A and 5B, only illustrated optical paths of LD-OF and OF-LD, respectively, are shown. As shown in each of FIGS. 5A and 5B, a reception channel, which is emitted upward from an edge of an optical fiber OF at a lower side and is directed toward a PD on the left, and a transmission channel, which is emitted rightward from an LD on the left and is directed toward an edge of an optical fiber at the lower side are drawn while being projected in parallel with a two-dimensional cross-section. Luminous fluxes leaking to the outside from the 45-degree plane of the prism are ones which do not satisfy total reflection conditions.

As shown in FIG. 5A, in the prism 10 of the present invention, an incident light beam flux 22 is reflected on the reflection plane 16 after being converged by an aspherical lens 24 and the incident light beam flux 22 is converged by an aspherical lens 26 again. Meanwhile, in FIG. 5B, the incident light beam flux 22 made incident on a prism 28 is once converged by a spherical lens 30 and, thereafter, the incident light beam flux 22 is reflected on the reflection plane 16 and further converged by a spherical lens 32.

The edge of the optical fiber is disposed away from the prism edge by 330 micrometers and the LD and PD are also disposed away from the prism edge by 330 micrometers. The above-described distance satisfies conditions that light does not intrude into a lens of an adjacent channel at the incident point on the prism (lens) (light from the fiber is 470 micrometers at 12 degrees on one side and 373 micrometers at 15 degrees, and light from the LD is 335 micrometers at 20 degrees). Moreover, the simulations are performed assuming that the OF and the LD are placed at symmetrical positions which satisfy optical requests.

The light emitted from the fiber is assumed to have a Gaussian distribution such that a strength of 10% is obtained at an exit angle of 12 degrees from the optical axis. In accordance with the measured value, the light emitted from the LD is assumed to have a Gaussian distribution such that a strength of 50% is obtained at 10 degrees from the optical axis (note that the light is changed to be flat and 100% at 7 degrees or less). Assuming that there is no surface reflection, sufficient coupling factors can be obtained, including 88% in the reception channel (from the fiber to the PD) and 98% in the transmission channel (from the LD to the fiber). If a refractive index of resin used for the prism, parameters for the lens and distance or the shape of the lens are further optimized, much higher coupling factors can be obtained. Alternatively, a communication speed can be increased by further reducing a light receiving diameter of the PD. Note that, in the incidence on the fiber, a luminous flux at an incident angle which does not satisfy NA=0.2 of the fiber, that is, 12 degrees is not counted in the coupling factor.

As is apparent in FIG. 5A, when the surface reflection is ignored, the crosstalk to the adjacent channel is 0 at the light receiving portion (the PD in a receiver and the fiber in a transmitter). Moreover, when the light is made incident on (the lens of) the prism as well as when the light is emitted from (the lens of) the prism, there is no luminous flux intruding into the adjacent channel. In other words, although a number of channels disposed in parallel share a space within the prism having no partitions, there occurs no crosstalk.

As understood by comparing FIGS. 5A and 5B, in the prism 10 of the present invention including the aspherical lenses, there is significantly less stray light to the optical path of the other incident light beam flux 34 on the output plane in the position corresponding to the incident light beam flux 22. Meanwhile, in FIG. 5B as the comparative example, in the prism 28 including the spherical lens, there is much stray light between the corresponding light beam fluxes on the output plane 14. It is shown in FIG. 5B that if the prism 28 is included in the optical link module, there occur crosstalks intensively.

Specifically, according to the present invention, the prism including the aspherical lenses gives high coupling efficiencies and provides a small-sized optical link module with less crosstalks.

Figure 6:
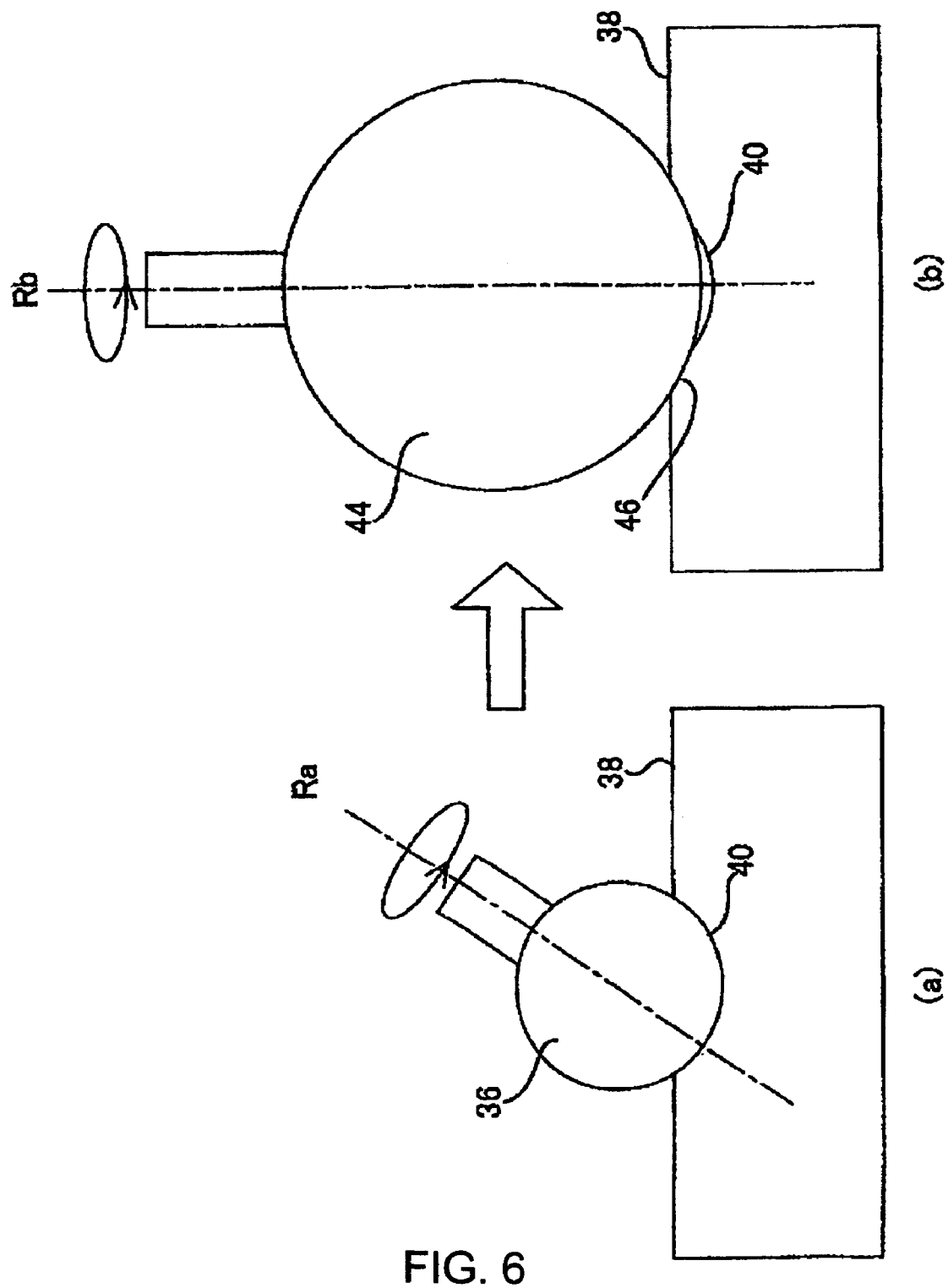
FIGS. 6A and 6B are views showing one of steps of a method for manufacturing the optical turn of the present invention.

The prism used in the present invention can be formed by use of various methods. From the viewpoint of costs and productivity, the above-described prism having the aspherical lenses formed therein can be manufactured from a plastic material such as polycarbonate and polymethylmethacrylate by use of compression molding using a mold or injection molding. For the above-described molding technologies, a precise mold is required. Thus, in the present invention, manufacturing of the mold is also studied as described later. FIGS. 6A and 6B show a part of a process of manufacturing a mold to form the prism of the present invention.

Both of the spherical surfaces of the lenses required in the specific embodiment of the present invention can be simple spherical surfaces. Thus, it is preferable to manufacture the prism of the present invention by use of only a cutting step of the spherical surfaces by use of a high-precision processing device using a drill-shaped tool with a spherical tip. In this event, as the above-described tool, specifically, it is possible to use a cutting tool made from high-hardness ceramics containing diamond powder or a high-strength metal material.

With reference to FIGS. 6A and 6B, the steps of manufacturing the prism of the present invention will be further described. First, as shown in FIG. 6A, for example, a cutting tool 36 including a cutting blade with a diamond powder or a ceramic powder sintered thereon is rotated while abutting on a mold surface 38 of a metal mold and sloping a rotation axis Ra. Thereafter, while avoiding a decrease in a surface speed of the cutting blade on an extension of the rotation axis Ra, a concave portion 40 corresponding to the inner lens with a small diameter is subjected to cutting processing with respect to the mold. Next, as shown in FIG. 6B, in order to form a second concave portion 42 corresponding to the outer lens with a large diameter, the concave portion 40 corresponding to the lens with the small diameter is already formed and thus it is not necessary to consider the decrease in the surface speed of the cutting blade on an extension of a rotation axis Rb.

Thus, as shown in FIG. 6B, it is possible to subject a concave portion 46 with a large diameter to cutting processing by allowing a cutting blade 44 with a large diameter to abut on the mold surface 38 at a right angle. The mold can be manufactured by repeating the above-described processing for the number of necessary lenses and dispositions. In the present invention, the mold includes: at least two optical surfaces of which one ends are connected to each other, the optical surfaces being formed of a molded surface shown in FIGS. 6A and 6B; and a molded surface forming a reflection surface which connect the other ends of the optical surfaces to each other. By use of these three molded surfaces and a molded surface for forming an opposite side surface, a space for forming the prism is defined. In the mold, for injecting a plastic material, an injection hole is formed on an optically inactive surface, for example, in a side portion.

In manufacturing of the prism, the above-described mold is installed in an injection molding machine and the plastic material is injected from the injection hole. Thereafter, the mold is cooled to a temperature at which liquidity of the plastic material can maintain a shape and the mold is opened. Thus, the prism of the present invention can be formed. In this event, any known mold-releasing technology and finishing processing such as deburring can be used at the same time.

The prism manufactured by use of the mold formed according to the present invention and the above-described plastic molding technology gives a favorable coupling efficiency in the optical link module using the two-dimensional fiber array. According to the present invention, an optical link module with favorable characteristics is provided.

Figure 7:
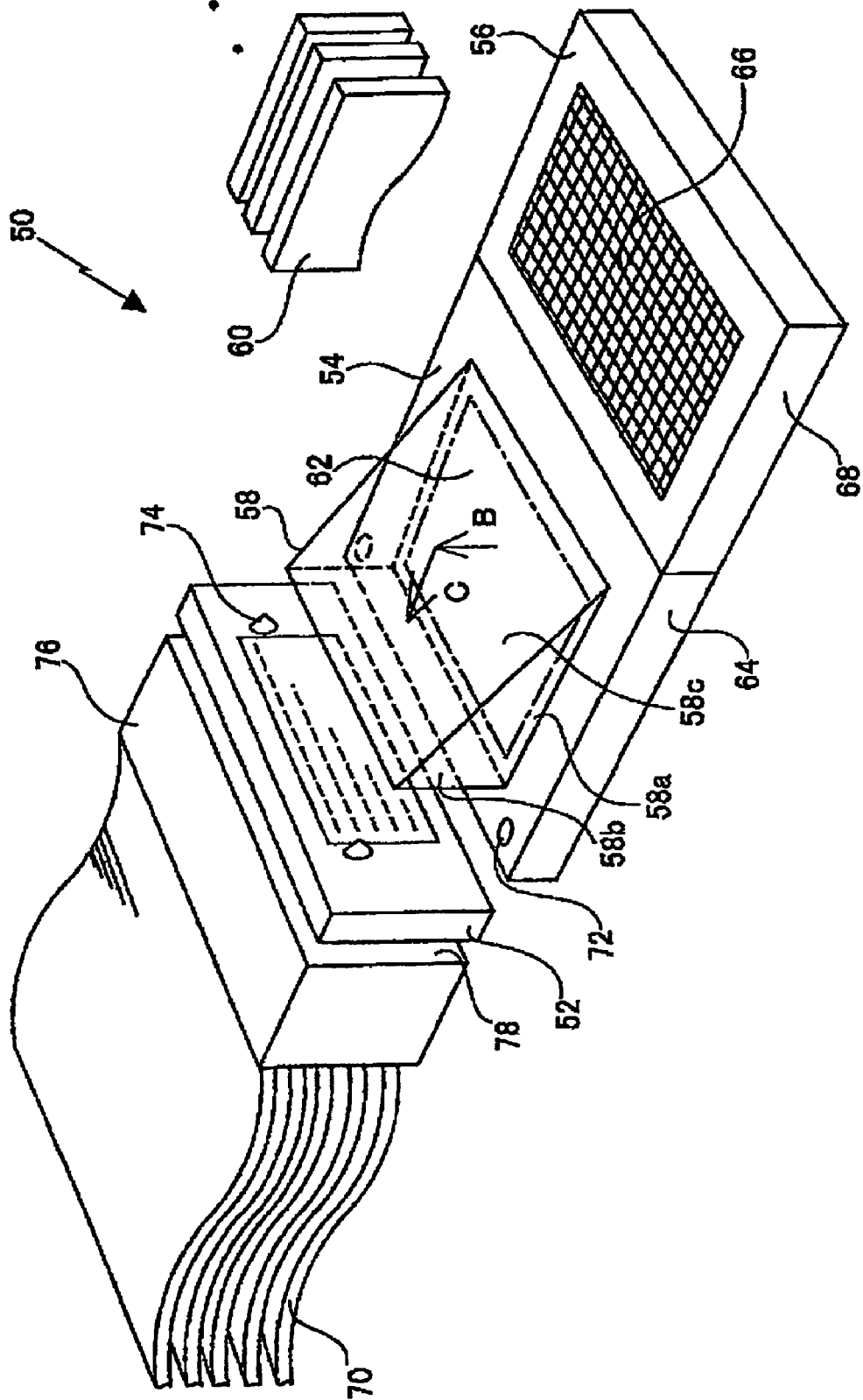
FIG. 7 is an exploded perspective view of an optical link module of the present invention.

FIG. 7 shows an optical link module having a module configuration by use of the prism of the present invention. The optical link module 50 of the present invention includes: a connector part 52; a light-emitting part 54; a driver part 56 and the prism 58 of the present invention. The connector part 52 can shield the optical link module 50 of the present invention from an external environment and can combine light beams into an optical fiber bundle to be described later in a vertical direction by means of passive alignment.

In the specific embodiment of the present invention, the light-emitting part 54 is configured as a dotted light emitting source disposed two-dimensionally, for example, a planar light source configured as an array of laser diodes or light-emitting diodes (VCSEL/PD). The light-emitting part 54 has a configuration in which a bundle of two-dimensionally arranged diverging beams which are generated from light emitting devices to be described later is emitted toward a direction of the arrow B. Moreover, the driver part 56 is configured as an integrated circuit including a driver transistor and a current amplifier transistor which supply a signal and a drive current to the light-emitting part 54. In the specific embodiment of the present invention, a heat sink 60 disposed adjacently to the driver part 56 suppresses heat generated by the driver part 56 and stabilizes characteristics.

On an incidence plane 58a and an output plane 58b of the prism 58, aspherical lenses configured according to the present invention are disposed corresponding to the light beams. The prism 58 deflects the light beams emitted in the direction of the arrow B toward a direction indicated by the arrow C so as to correspond to the dotted light-emitting source on a reflection plane 58c. Moreover, the prism 58 can converge the light beams again by use of the aspherical lenses on the output plane 58b before making the light beams incident on the connector part 52. Note that the prism 58 shown in FIG. 7 is disposed in such a manner that the incidence plane 58a and the output plane 58b make a right angle and has the incidence plane 58a and the output plane 58b which have different lengths from each other. In this case, uniformity of latency in the output plane 58b is not sufficient compared to the embodiment in which the incidence plane 58a and the output plane 58b have the same length as shown in FIG. 1. However, the prism 58 shown in FIG. 7 has sufficient effects in terms of providing a high coupling efficiency and enabling the passive alignment while reducing the crosstalks.

The light-emitting part 54 further includes: a light-emitting device part 62 such as laser diodes or light-emitting diodes; and a circuit board 64. The light-emitting device part 62 can contain any known active materials such as GaAs, GaAlAs and InGaAsP, for example, and is connected to the circuit board 64 by use of an implementation method such as a soldering bump method. Similarly, the driver part 56 also includes: a driver element part 66 including a driver transistor and a current amplifier transistor; and a circuit board 68. The driver element part 66 and the circuit board 68 are connected to each other by use of the implementation technology such as the soldering bump method.

The connector part 52 shields the optical link module from the outside as described above and enables the light beams to be coupled into an optical fiber bundle 70 by means of the passive alignment. In the connector part 52, for example, optical fibers and the like are buried, which allow the light beams emitted from the prism 58 to pass therethrough. The connector part 52 and the light-emitting part 54 are positioned with high accuracy by use of unillustrated positioning protrusions and positioning grooves 72 and are electrically connected to each other. Moreover, the connector part 52, the light-emitting part 54 and the prism 58 are positioned in a region where there is no optical influence by use of, for example, positioning protrusions 74 formed on the connector part 52 and unillustrated positioning grooves formed on the prism 58, the positioning grooves corresponding to the positioning protrusions 74. Moreover, as to positioning of the light-emitting part 54 and the prism 58, in the embodiment shown in FIG. 7, the light-emitting part 54 and the prism 58 are positioned by use of unillustrated positioning means formed so as to correspond to a mutual contact surface of the light-emitting part 54 and the prism 58. Moreover, in another embodiment of the present invention, as a configuration which enables the passive alignment directly in the light-emitting part 54, plugs to be described later can form, for example, the positioning protrusions, the positioning grooves and the like.

In the embodiment shown in FIG. 7, a plug 76 is coupled with one end of the optical fiber bundle 70. This plug 76 can be coupled therewith while being positioned with high accuracy with respect to the connector part 52. Moreover, a housing part 78 in which the optical fibers are optically exposed is formed at the connector 52 side of the plug 76. Thus, by use of the housing part 78, the light beams passing through the connector part 52 can be received with a high coupling efficiency. The other end of the optical fiber bundle 70 is connected to another information processor or to another device within the same information processor. Thus, an optical signal of the light-emitting part 54 driven by the driver part 56 can be transferred within the information processor.

Figure 8:
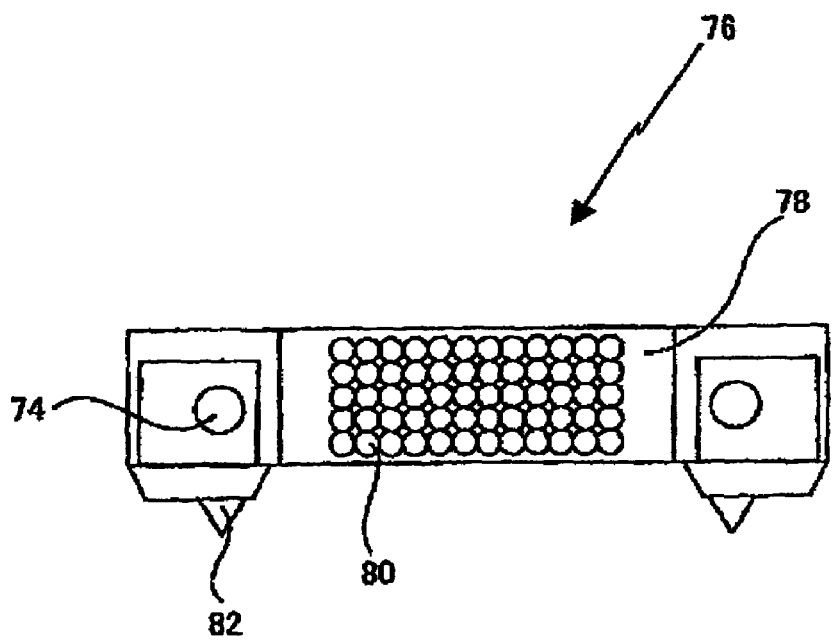
FIG. 8 is a front view showing details of a light receiving part of a plug used in the present invention.

FIG. 8 is a front view showing a detailed configuration in a state where the plug 76 usable in the present invention is coupled with the housing part 78. In the housing part 78 of the plug 76 shown in FIG. 8, multimode optical fibers 80 are exposed while overlapping with each other in vertical and horizontal directions. Here, the number of the optical fibers 80 corresponds to the number of the dotted light-emitting devices of the light-emitting part 52.

In a specific embodiment shown in FIG. 8, in the optical fibers 80, a total of 60 optical fibers including 12 rows in the horizontal direction and 5 rows in the vertical direction are disposed adjacently to each other. Thus, 60 communication channels are provided.

According to the present invention, these communication channels have high coupling efficiencies and less crosstalks, respectively, and receive light beams emitted downward from the page top. In the embodiment using 60 of the multimode fibers, the plug 76 shown in FIG. 8 can be formed to have a size of approximately several millimeters. Thus, according to the present invention, a signal wiring which is extremely miniature and highly integrated can be configured. Moreover, in the plug 76 shown in FIG. 8, positioning protrusions 82 for positioning the light-emitting part 52 are formed. The signal wiring using the above-described optical link module of the present invention does not use charged particles such as electrons but light as a medium. Thus, even if the integration degree is increased, reliability is not changed by heat generation or the like and high-speed data communications are possible.

Figure 9:
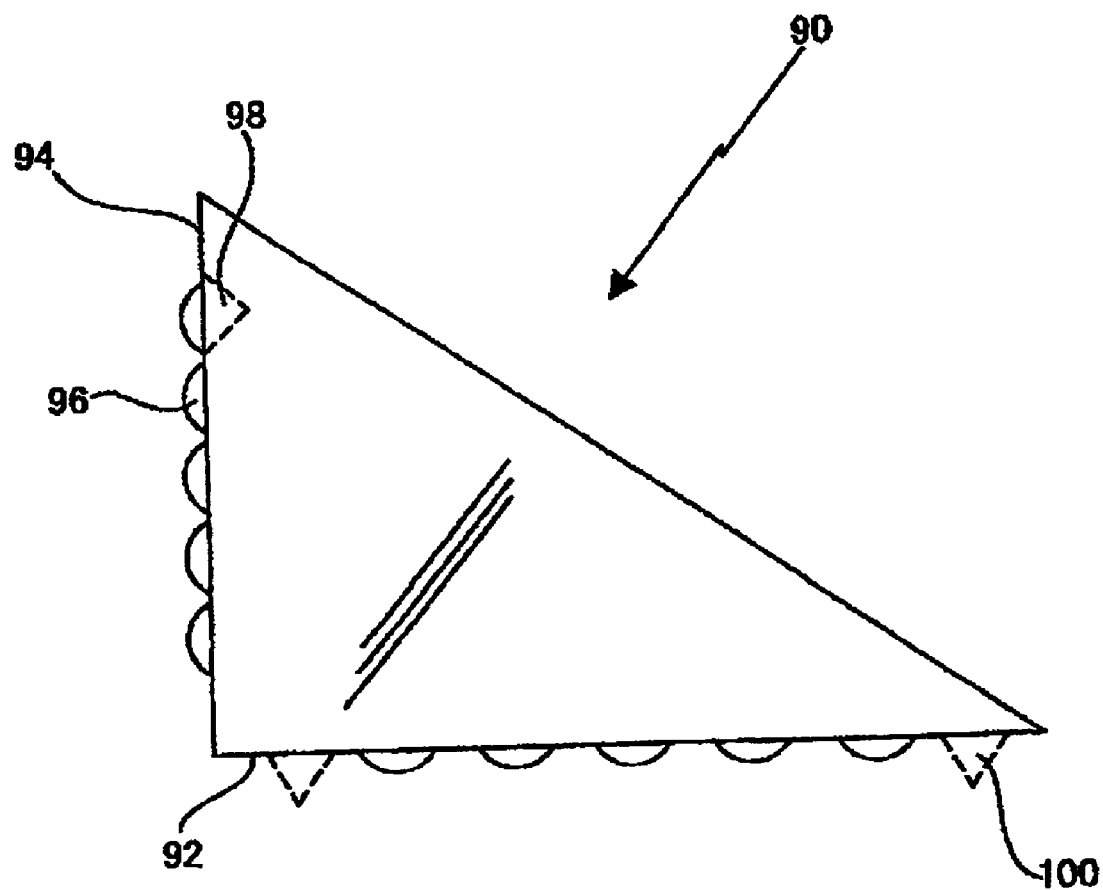
FIG. 9 is a detailed side view of the optical turn of the present invention.

FIG. 9 is a side view of a prism 90 of the present invention by use of another embodiment in which aspherical lenses and positioning protrusions are integrally formed. The prism 90 of the present invention shown in FIG. 9 is formed as a rectangular prism and is formed by injecting resin into a mold and using a resin molding technology. In the embodiment of the prism 90 shown in FIG. 9, two surfaces forming an incidence plane 92 and an output plane 94 intersect with each other at a right angle and thus the rectangular prism is configured. Moreover, on the incidence plane 92 and the output plane 94, 12 by 5 pieces of aspherical lenses 96 having the same shape are arranged so as to correspond to the plug 76 shown in FIG. 8.

The light beams do not pass through both ends of the lens arrays. Thus, unillustrated positioning means, for example, positioning grooves and positioning protrusions can be formed. In the prism 90 shown in FIG. 9, a positioning groove 98 and positioning protrusions 100, which are indicated by broken lines, are formed corresponding to the positioning means formed in the plug 76. Moreover, in the prism 90 shown in FIG. 9, at an optically allowable position, a support element can be further formed for securing a mutual distance between the prism 90 and LD/PD/prism/ fiber. Thus, a mutual distance between the optical elements can be maintained constant. Note that the positioning protrusions and the positioning grooves can be disposed on any constituent members as long as the positioning protrusions and the positioning grooves are formed corresponding thereto.

In the prism 90, for the purpose of improving reflection properties of the incidence plane 92, the output plane 94 and the reflection plane 102, the aspherical lenses or plane elements including the incidence plane, output plane and reflection plane of the prism can be subjected to coating (thin-film processing) after the molding processing of the prism. Any conventionally known coating methods can be used as the above-described coating and, as an example, dielectric multilayer coating can be applied to obtain proper reflection and transmission properties. Moreover, in the present invention, laser beams with long wavelengths and high coherence are mainly used. Thus, multicoating is not necessarily used.

Figure 10:
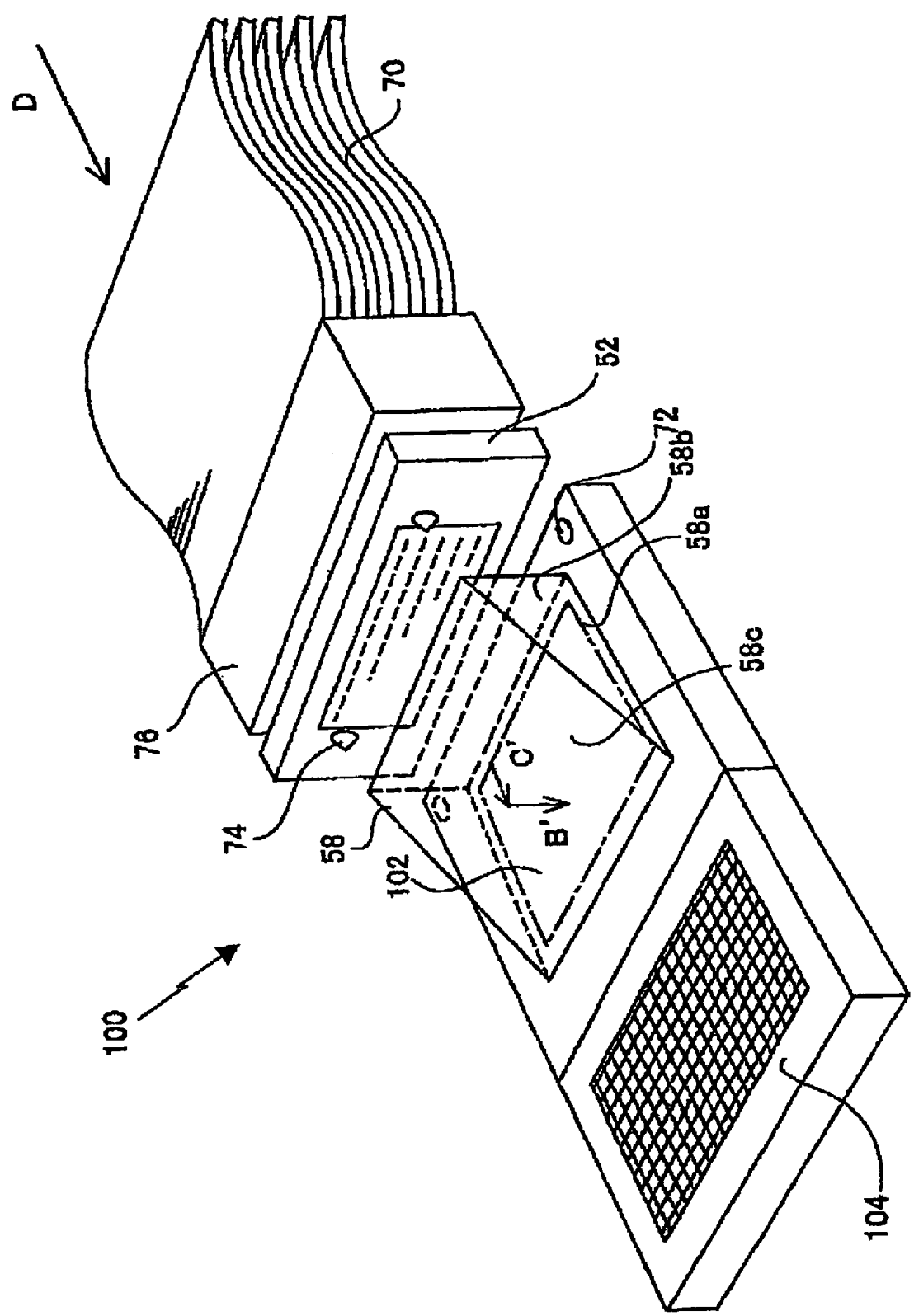
FIG. 10 is a perspective view showing an embodiment of a light receiving part configured by use of the optical link module of the present invention.

FIG. 10 shows an embodiment of a planar photodetector 100 formed by use of the optical link module of the present invention. The planar photodetector 100 shown in FIG. 10 has approximately the same configuration as the embodiment shown in FIG. 7. However, light beams emitted from light-emitting devices are transmitted through an optical fiber in a direction of the arrow D and are made incident on the prism 58 of the present invention via the plug 76 and the housing part 52. The light beams made incident on the prism 58 pass through optical paths B' and C', which are reverse to those described in FIG. 7, and are irradiated on an optical active portion of a light receiving device part 102 in which light receiving devices are arranged in a planar manner.

The light receiving device part 102 can be formed on a suitable circuit board by use of a semiconductor technology while including devices having proper responsiveness and amplification capability, such as photodiodes, PIN photodiodes and avalanche photodiodes, for example. Moreover, to the light receiving device part 102, a current amplifier part 104 including transistors and the like is connected. Thus, electric signals are transmitted to other devices of an unillustrated information processor.

Figure 11:
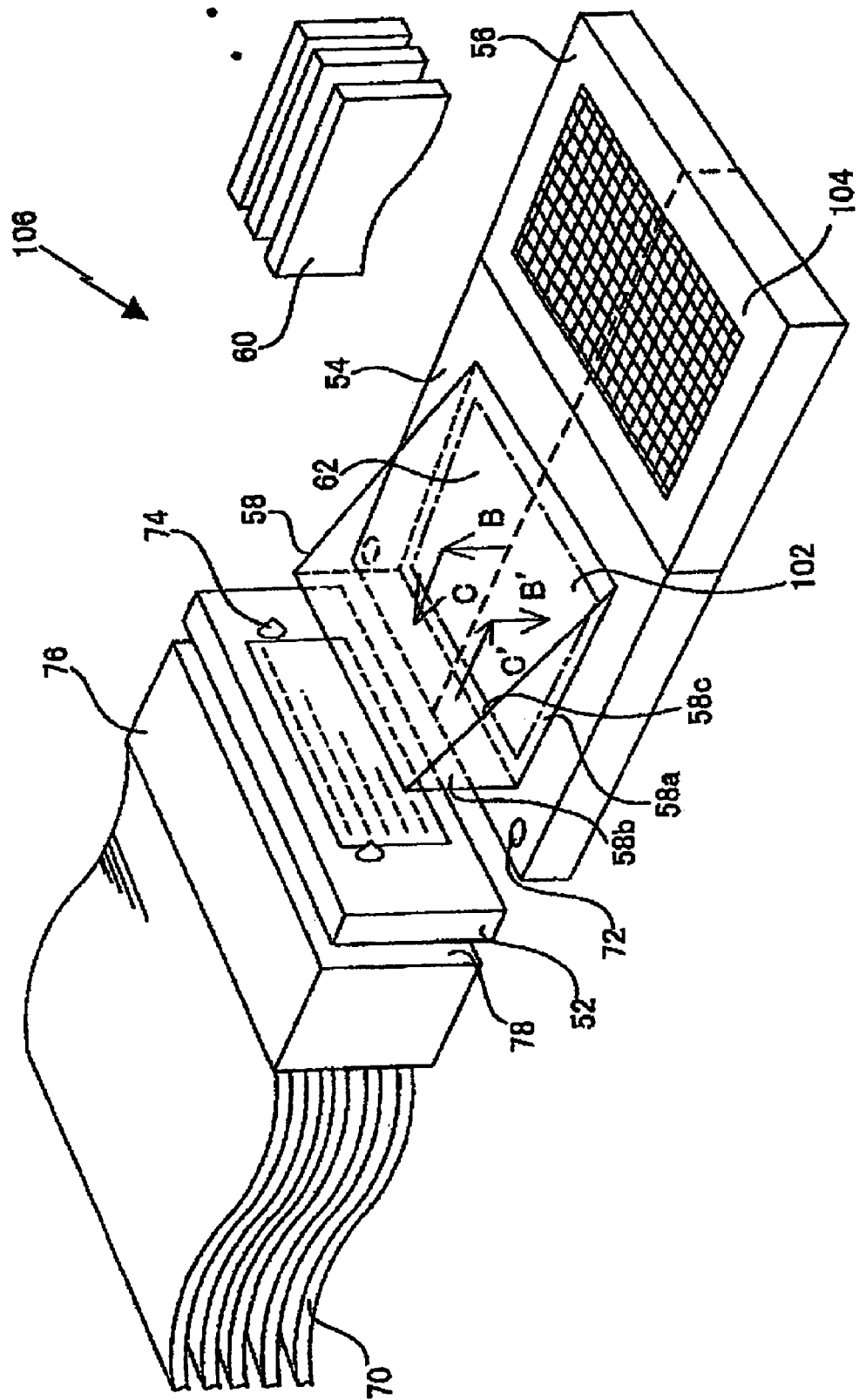
FIG. 11 is a view showing an embodiment of an optical link module capable of two-way optical communications according to the present invention.

FIG. 11 shows an embodiment of an optical link module of the present invention, which is capable of two-way optical communications according to the present invention. The optical link module 106 of FIG. 11 has approximately the same configuration as those described in FIGS. 7 and 10. However, the light receiving device part 102 and the light emitting device part 62 are formed adjacently to each other and, while corresponding thereto, the driver part 56 and the current amplifier part 104 are formed adjacently to each other. The optical link module 106 capable of the two-way optical communications, which is shown in FIG. 11, has, for example, 30 channels as transmission channels and remaining 30 channels as reception channels. Thus, it is made possible to provide compact and high-speed interconnections.

Figure 12:
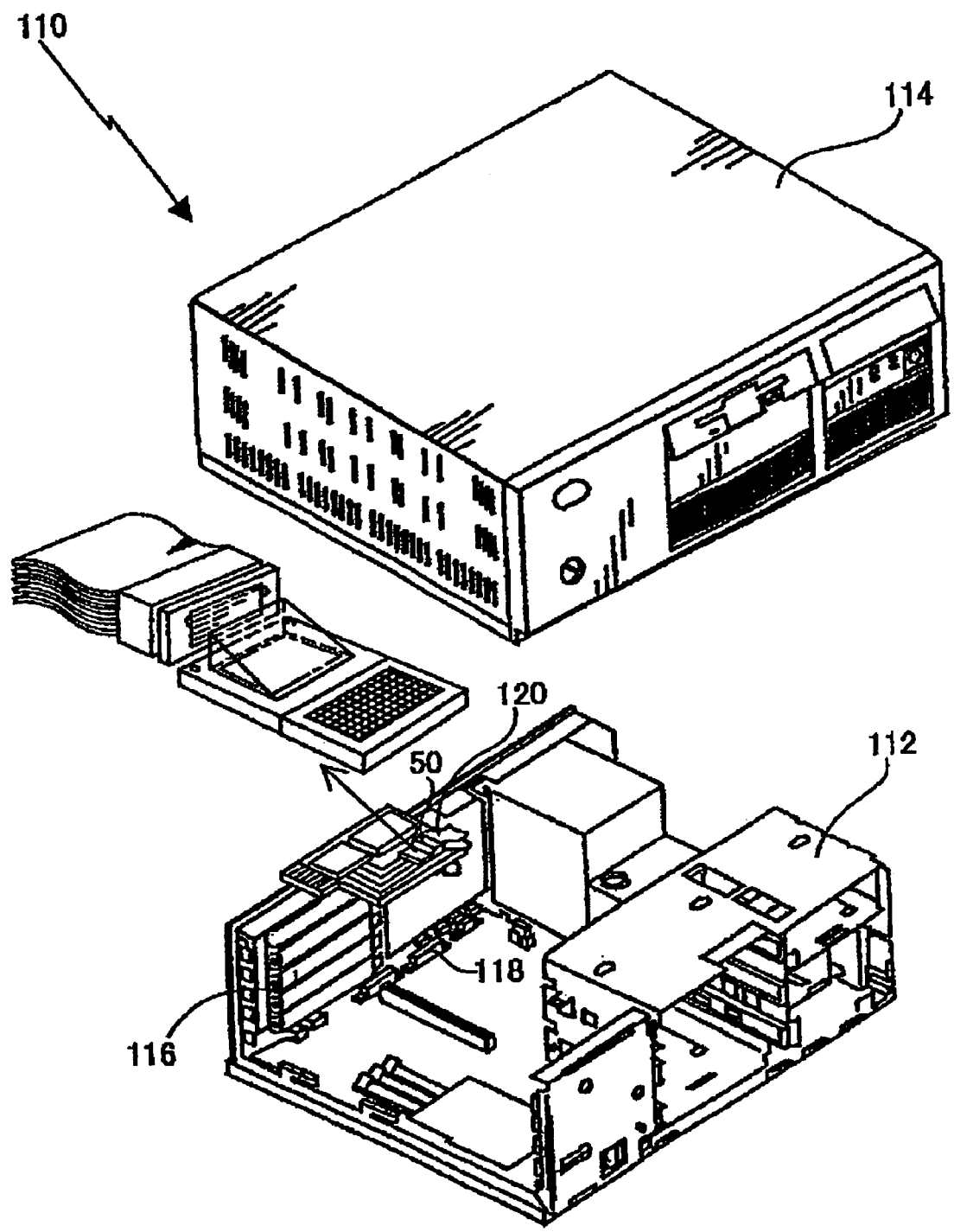
FIG. 12 is an exploded perspective view of an information processor of the present invention.

FIG. 12 is an exploded perspective view of an information processor including the optical link module of the present invention. The information processor 110 shown in FIG. 12 includes: various storage media such as a flexible disk, a hard disk and a CD-ROM; a chassis 112 which houses a central processing unit (CPU) and memories such as a ROM and a RAM; and a housing body 114 for shielding the chassis 112 from the outside. The chassis 112 includes: a slot 116 to which an expansion board capable of mounting a SCSI board and the like can be inserted; a socket 118 on which various kinds of circuit boards can be loaded; and the like.

Furthermore, the optical link module 50 of the present invention can be disposed at a proper position within the chassis, together with a proper circuit board in the chassis or as an independent control board. In the embodiment shown in FIG. 12, the optical link module 50 is connected to the socket 118 formed approximately in the center of the chassis 112 and thus is formed on an independent circuit board together with the CPU and the like, for example. The optical link module 50 enables an optical fiber bundle 120 to be provided to wiring elements such as signal wiring, data wiring and clock wiring in the information processor 110 and enables speeding-up and miniaturizing of the wiring elements in the information processor by use of the optical fiber.

Moreover, besides the configuration shown in FIG. 12, the optical link module 50 can be configured as a network interface for transmitting/receiving information to/from another information processor by extracting the optical fiber bundle 120 from the optical link module 50 of the present invention to the outside of the information processor 110. For example, the optical link module 50 can be used as a high-density/high-speed network interface for grid computing via a network such as a LAN, a WAN and the Internet.

Figure 13:
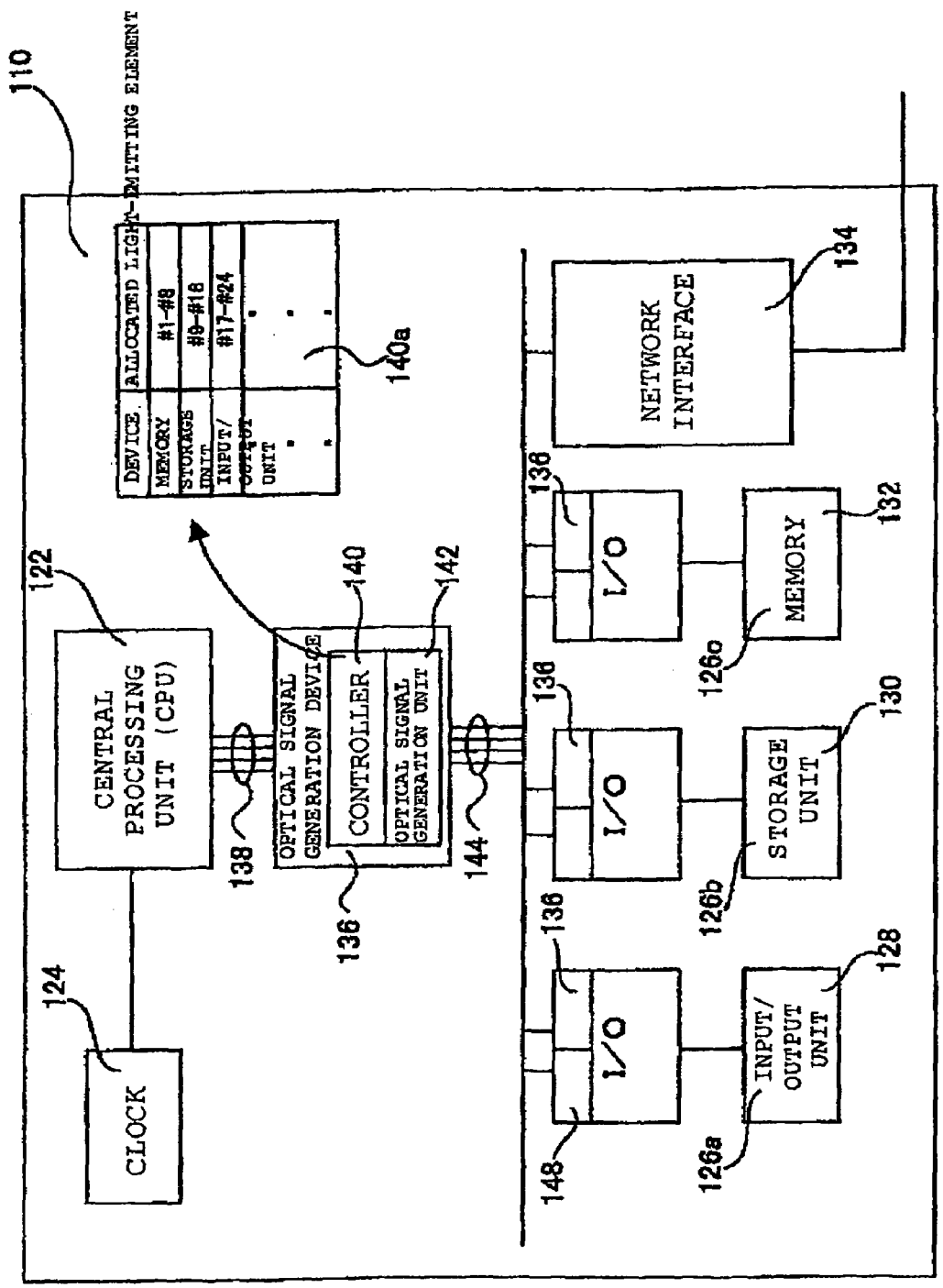
FIG. 13 is a functional block diagram of the information processor of the present invention.
Figure 14:
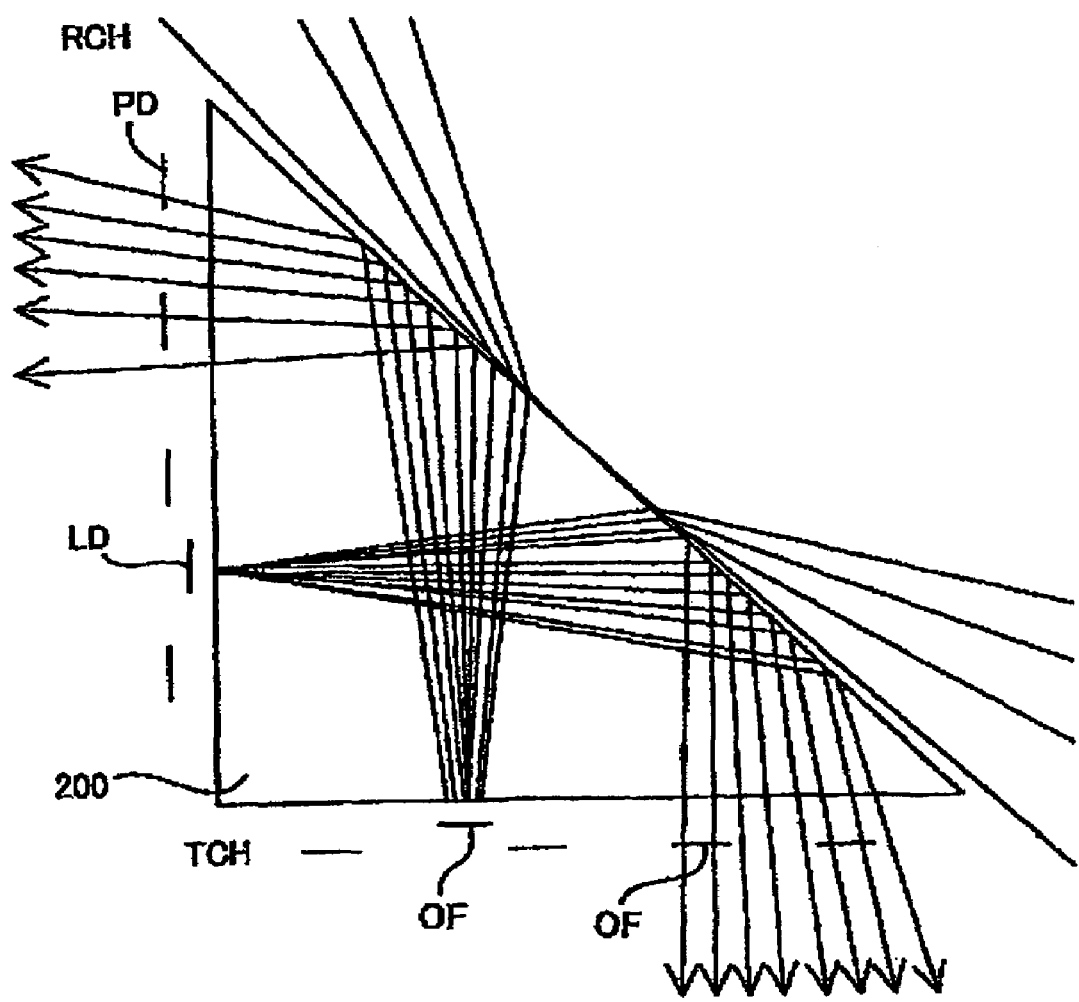
FIG. 14 is a view showing schematic results of a ray tracing simulation of an optical turn having spherical lenses formed on an optical surface.

FIG. 13 shows a schematic functional block diagram of the information processor of the present invention. The information processor shown in FIG. 13 includes: a central processing unit (CPU) 122; a clock 124 for driving the CPU 122; various I/O devices 126a to 126c; an input/output unit 128 for devices such as a display and a printer; a storage unit 130 including a flexible disk, a hard disk, a CD-ROM, a DVD and the like; a memory 132 such as a RAM; a network interface unit 134 is included depending on a necessity; and the like. The input/output unit 128, the storage unit 130, and the memory 132 are connected via the I/O devices. The information processor 110 of the present invention further includes an optical signal generation device 136 including the optical link module of the present invention.

In the embodiment described in FIG. 13, to be specific, the CPU 122 is assumed to perform output in order to store results of its processing in the memory 132, for example. However, in the present invention, the optical signal generation device can be included as any constituent component or element in the information processor 110. A write request and an output signal from the CPU 122 are transmitted to the optical signal generation device 136 as electrical signals via an optical fiber bundle 138. Moreover, in the embodiment shown in FIG. 13, for simplicity, there are four outputs from the CPU 122. However, in the present invention, for example, inputs of 60 channels are also possible and any number of inputs and outputs can be applied besides the above.

The optical signal generation device 136 includes a controller 140 and an optical signal generation unit 142 configured according to the present invention. Upon receipt of the output signal, the controller 140 looks up in an allocation table 140a stored in a storage region of the controller 140, for example, and determines the device which has requested output of the CPU 122. In the embodiment described above, the CPU 122 requests write into the memory 132 and thus the controller 140 selects light emitting devices allocated as an address line and a data line for performing the write into the memory 132. Thereafter, an address signal and a data signal are transmitted, respectively, to the selected light emitting devices and optical signals corresponding thereto are generated as optical pulses.

Moreover, in the present invention, it is considered that, as a communication speed becomes higher, a one-to-one communication is mainly performed between the nodes. In this case, it is not required to include the allocation table 140a for allocating the light-emitting devices and the light receiving devices for every node.

The generated optical pulses are transmitted to an optical fiber bundle 144 through the aspherical lens of the present invention and are transmitted to the I/O device 126c via the optical fiber bundle 144. The I/O device 126c includes, for example, the planar photodetector 146 of the present invention, which is shown in FIG. 10. The I/O device 126c can convert the received optical signal into a corresponding electrical signal to be written into a proper address of the memory 132.

Moreover, in another aspect of the present invention, the optical signal generation device 136 can be configured by use of the optical link module capable of the two-way optical communication of the present invention, which is shown in FIG. 12. Furthermore, the I/O devices 126a to 126c can include the optical signal generation device 136 using the optical link module capable of the two-way optical communication shown in FIG. 12. According to the other embodiment of the present invention described above, signal transfer using the optical signals is also possible from the other devices, such as the input/output unit, the storage unit, the memory and the network interface, to the CPU 122. Thus, it is possible to configure optical interconnections capable of two-way communications.

The present invention has been described above by use of the specific embodiments shown in the drawings. However, it should be understood by those skilled in the art that the present invention is not limited to the above-described embodiments and may be configured as other embodiments including various modifications, exclusions, additions and the like.

The invention claimed is:

1. A signal transfer method in an information processor including at least a central processing unit, a memory and an input/output unit, the method comprising the steps of:

providing electrical signals based on instructions of the central processing unit; generating a plurality of optical signals, in an optical signal generation unit, from the electrical signals;

transmitting the optical signals, which are generated by the optical signal generation unit, inside optical waveguides via light receiving parts; and inputting instructions from the central processing unit into other devices by receiving the optical signals emitted from the optical waveguides and converting the optical signals into electrical signals, wherein the step of generating optical signals includes the steps of generating optical signals by driving surface emitting elements in response to the electrical signals, deflecting a direction of the light beams transmission by use of an optical bend including aspherical lenses formed in accordance with the optical signals and coupling the deflected light beams with a plurality of optical waveguides via the aspherical lenses formed in accordance with the light beams.

2. The signal transfer method according to claim 1 comprising deflecting the direction of the light beam by about 90 degrees by the use of an optical turn including spherical lenses formed in accordance with the optical signals.

3. The signal transfer method according to claim 1, wherein the step of deflecting the light beams further includes the step of generating refractions with a plurality of different curvatures by using the aspherical lenses corresponding to the light beams from the light emitting devices and by taking an optical axis of each aspherical lens as a center.

* * * * *